US009800524B1

(12) United States Patent
Goren

(10) Patent No.: US 9,800,524 B1
(45) Date of Patent: Oct. 24, 2017

(54) SWITCHING METHODS AND SYSTEMS FOR A NETWORK INTERFACE CARD

(71) Applicant: QLOGIC Corporation, Aliso Viejo, CA (US)

(72) Inventor: Nir Goren, Herut (IL)

(73) Assignee: QLOGIC Corporation, Aliso Viejo, CA (US)

( * ) Notice: Subject to any disclaimer, the term of this patent is extended or adjusted under 35 U.S.C. 154(b) by 252 days.

(21) Appl. No.: 14/864,323

(22) Filed: Sep. 24, 2015

(51) Int. Cl.
*H04L 12/861* (2013.01)
*H04L 29/08* (2006.01)

(52) U.S. Cl.
CPC ...... H04L 49/9078 (2013.01); H04L 67/2842 (2013.01)

(58) Field of Classification Search
CPC ....... H04L 2012/5614; H04L 29/12952; H04L 61/6077; H04L 49/9068
See application file for complete search history.

(56) References Cited

U.S. PATENT DOCUMENTS

| 7,890,672 | B2 * | 2/2011 | Kato | G06F 13/385 |
| | | | | 709/250 |
| 2005/0213570 | A1 * | 9/2005 | Stacy | H04L 47/32 |
| | | | | 370/389 |
| 2016/0342547 | A1 * | 11/2016 | Liss | G06F 13/385 |
| 2017/0034268 | A1 * | 2/2017 | Govind | H04L 67/1097 |

* cited by examiner

*Primary Examiner* — Robert M Morlan
(74) *Attorney, Agent, or Firm* — Klein, O'Neill & Singh, LLP

(57) ABSTRACT

Methods and systems for network communication are provided. One method includes, receiving a network packet at a first network interface card (NIC) operationally coupled to a computing device; identifying a second NIC as a destination for the network packet; placing the network packet by the first NIC at a host memory location, without utilizing resources of a processor of the computing device; notifying the second NIC that the network packet has been placed at the host memory location; retrieving the network packet by the second NIC from the host memory location; transmitting the network packet by the second NIC to another destination; notifying the first NIC by the second NIC that the packet has been transmitted by the second NIC; and freeing the host memory location by the first NIC.

21 Claims, 5 Drawing Sheets

SWITCHING METHODS AND SYSTEMS FOR A NETWORK INTERFACE CARD

TECHNICAL FIELD

The present disclosure relates to network communications and, more particularly, to offloading switching functionality to a network interface card (NIC).

BACKGROUND

In conventional server systems with multiple network interface cards (NICs), a network packet received by a first NIC that needs to be delivered to a second NIC is typically processed software instructions executed by a central processing unit (CPU) of the server system. This uses the server system CPU, lowers throughput and increases latency for processing network packets. As network traffic continues to increase, continuous efforts are being made to improve network communications.

BRIEF DESCRIPTION OF DRAWINGS

The various aspects of the present disclosure will now be discussed in detail below. These novel and non-obvious aspects are depicted in the accompanying drawings, which are for illustrative purposes only. These drawings include the following figures, in which like numerals indicate like parts.

DETAILED DESCRIPTION

Figure 1A:
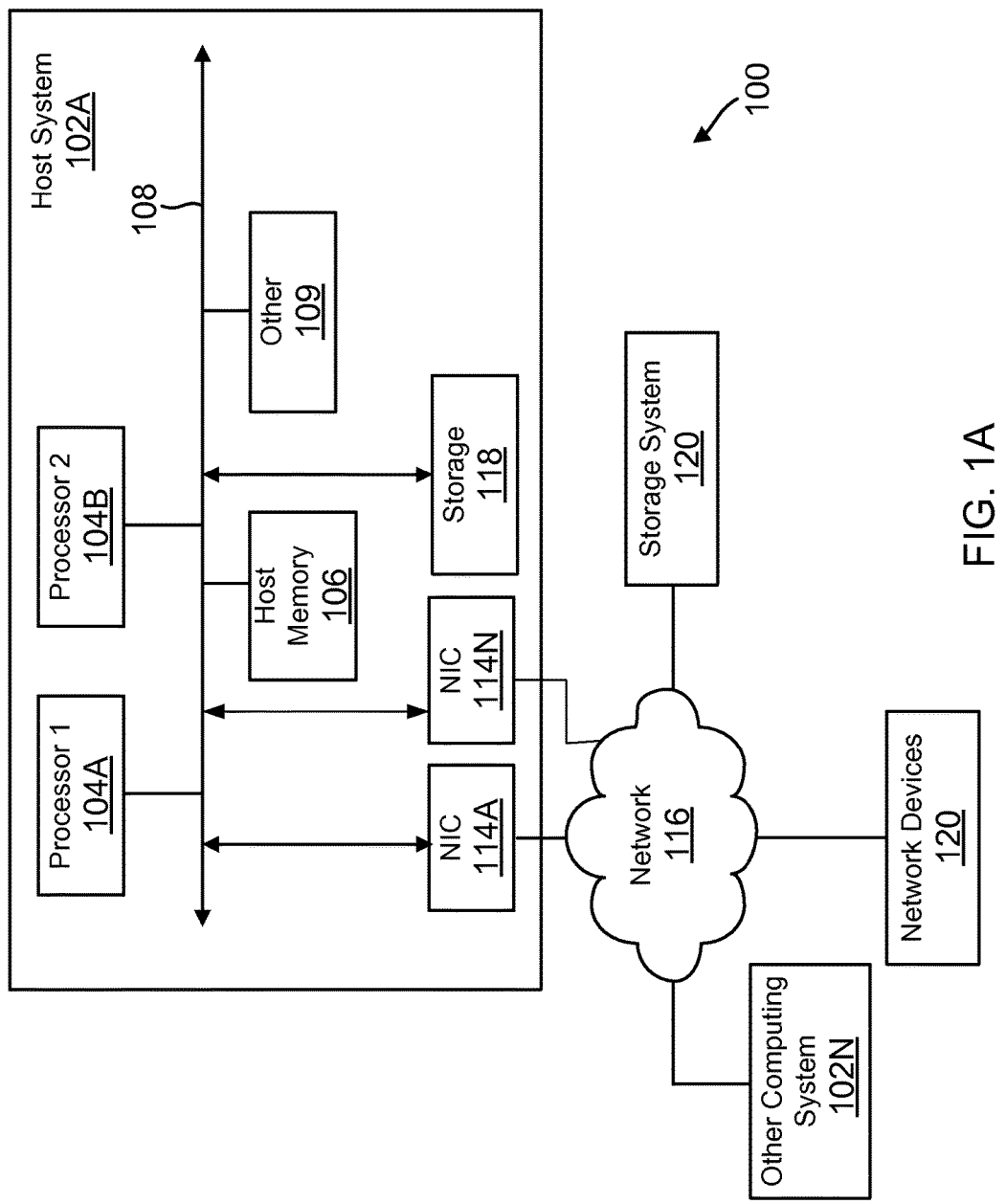
FIG. 1A is a functional block diagram of a system, according to one aspect of the present disclosure.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The various aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one aspect, methods and systems for network communication are provided. One method includes, receiving a network packet at a first network interface card (NIC) operationally coupled to a computing device; identifying a second NIC as a destination for the network packet; placing the network packet by the first NIC at a host memory location, without utilizing resources of a processor of the computing device; notifying the second NIC that the network packet has been placed at the host memory location; retrieving the network packet by the second NIC from the host memory location; transmitting the network packet by the second NIC to another destination; notifying the first NIC by the second NIC that the packet has been transmitted by the second NIC; and freeing the host memory location by the first NIC.

System 100:

FIG. 1A is a block diagram of a system 100 configured for use with the various aspects of the present disclosure. System 100 may include a plurality of computing systems 102A-102N (may also be referred to as server(s) 102 or host system(s) 102), used according to one aspect of the present disclosure. The host system 102A may include one or more processors 104A-104B (referred to as processor 104 or processors 104), also known as central processing units (CPUs) or processor cores. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 104 executes machine-implemented instructions (or process steps/blocks) out of a memory 106 that interfaces with an interconnect 108 (may be referred to as a computer bus 108). The computer bus 108 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The host system 102A may have access to one or more storage devices 118, which may include, for example, a non-volatile memory solid state storage device (for example, a Non-Volatile Memory Host Controller Interface Specification (NVMe) SSD), a hard disk (HDD) or any other storage device type (for example, a hybrid drive, a hard drive and others) for storing structured or unstructured data. NVMe is an industry standard that enables connection to a SSD coupled by a PCI-Express link. Storage 118 may be used to store data containers, for example, files, structured and unstructured data, as described below in detail. The adaptive aspects of the present disclosure are not limited to any specific storage device type.

Memory 106 interfaces with the computer bus 108 to provide the processor 104 with access to memory storage. Memory 106 may include random access memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown). Memory 106 may also be used by processor 104 to store send and completion queues for enabling communication between NICs, as described below in detail.

The host system 102A may also include other devices and interfaces 109, which may include a display device interface, a keyboard interface, a pointing device interface, and others. The details of these components are not germane to the inventive aspects disclosed herein.

In one aspect, computing system 102A includes or interfaces with one or more NICs 114A-114N (may be referred to as NIC 114 or NICs 114) to communicate with other devices and systems, for example, network devices 120 and storage system 120 via a network 116. In one aspect, NICs 114 include a switching module from switching packets to one another using host memory queues, as described below in detail. It is noteworthy that storage system 120 may have its own NICs that are used to communicate using network 116.

Network 116 may be the Internet, a local area network, a wireless network or any other network type. Network 116 may include one or more routers and switches that are used for transmitting network packets between various devices/systems. The routers and switches may be configured to operate using a network protocol or technology, for example, Ethernet. Ethernet IEEE 802.3 is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 10G (gigabits per second), 25G, 50G, 100G or any other operating rates of the network protocol. However, the adaptive aspects disclosed herein are not limited to any particular protocol, as long as the functional goals are met by an existing or new network protocol. The details of routers and switches are not provided as they are not germane to the adaptive aspects of the present disclosure.

Various other protocols/technologies may be used by host system 102A/NIC 114 to handle network/storage traffic, for example, Fibre Channel over Ethernet (FCoE), Fibre Channel, Internet over Small Computer System Interface (iSCSI), Remote Direct Memory Access (RDMA) and others.

Figure 1B:
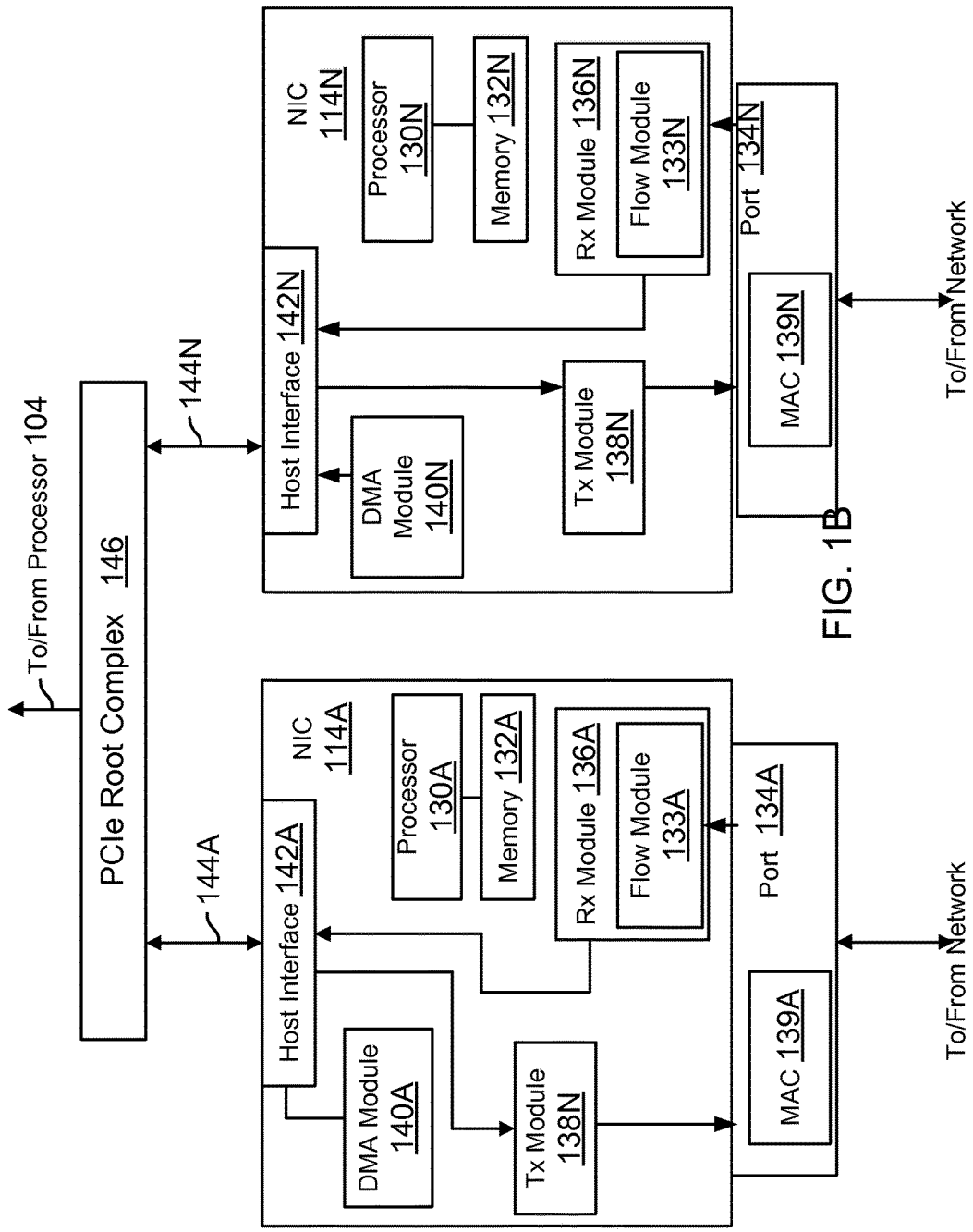
FIG. 1B shows a block diagram of NICs (network interface cards) communicating with one another, according to one aspect.

NICs 114A/114N:

FIG. 1B shows an architectural block diagram of NICs 114A-114N, according to one aspect of the present disclosure. A PCI-Express Root Complex 146 is operationally coupled with NICs 114A and 114N via links 144A/144N. The Root Complex 146 may be connected to computer bus 108.

NICs 114A/114N include a host interface 142A/142N respectively, for sending information to host memory 106 and receiving information from host memory 106. A direct memory access (DMA) module 140A/140N is used to receive data from host memory 106 and send data for host memory 106 queues that are described below. NICs 114A/114N may include a processor (or processing logic) 130A/130N having access to memory 132A/132N. Memory 132 may be used to store firmware instructions as described below in detail. It is noteworthy that the various aspects of the present disclosure may be implemented using other processing logic including without limitation digital signal processors (DSPs), programmable controllers, application specific integrated circuits (ASICs), programmable logic devices (PLDs), or the like, or a combination of such hardware devices.

NICs 114A/114N include one or more ports 134A/134N for sending and receiving information from network 116. Ports 134A/134N may be coupled to an Ethernet link or any other network link for receiving and transmitting network information (also referred to as frames). In one aspect, ports 134A/134N include logic and circuitry to receive and send network information complying with one or more protocols. As an example, each port includes a media address control (MAC) layer 139A/139N. The MAC Layers 139A/139N are part of the Data Link Layer of the standard OSI (Open System interconnect) networking model used for network communication. The MAC layers 139A/139N are responsible for moving data packets to and from the NICs 11-1A/114N.

NICs 114A/114N each include a receive module 136A/136N, respectively. The receive modules are used to temporarily stored information received from the network. The receive modules may include or interface with a flow module 133A/133N. The flow modules 133A/133N of each NIC determines if a received network packet is for another NIC and enables routing the packet to the NIC with involving the host processor 104, as described below in detail.

NICs 114A/114N further include a transmit module 138A/138N used to temporarily store information, before it is transmitted via ports 134A/134N.

Figure 1C:
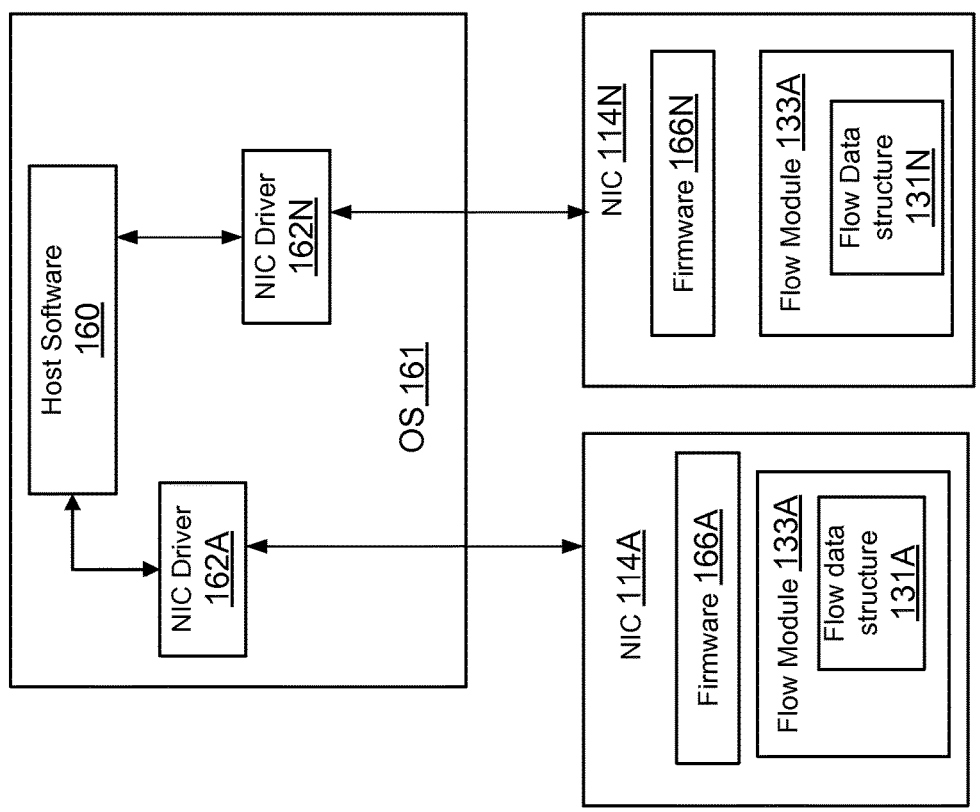
FIG. 1C shows an architectural block diagram used by the system of FIG. 1A, according to one aspect of the present disclosure.

Software Architecture:

FIG. 1C shows a high-level block diagram showing the software architecture used according to one aspect of the present disclosure. Although described in terms of software and/or firmware, it is noteworthy that these modules may be implemented in a variety of other ways, including hardware, as described above and understood by those of skilled in the art.

Host system 102A executes an operating system 161, such as, for example and without limitation, Linux based OS, UNIX, iOS, Microsoft® Windows, Android OS, or the like. The operating system 161 manages various applications, such as host software 160. As an example, host software 160 may include a network protocol stack that assists in processing network packets, as described below.

Host system 102A executes NIC drivers 162A and 162N (may be referred to as NIC driver or NIC drivers 162) that may interface with NIC firmware 166A/166N (may be referred to as NIC firmware 166) of NICs 114A/114N, respectively. NIC firmware 166 includes instructions that are executed by NIC processor 130 out of memory 132 for controlling the overall operations of the NICs. It is noteworthy that although two drivers are shown, the various aspects disclosed herein may be implemented by a single unified driver or more than two drivers.

The flow modules 133A/133N use a flow data structure 131A/131N is used to identify a flow to determine if a packet is destined to another NIC. In one aspect, data structures 131A/131N store the source and destination addresses, MAC address and other fields to determine if a flow is for another NIC. The details regarding these addresses will depend on the network operating environment and the protocols that are used for network communication. Therefore, the details of data structure 131A/131N may change based on the protocol type/operating environment. As an example, flow may be determined by a destination MAC address and a virtual local area network (VLAN) address for layer 2 (L2) switching. For a layer 3 (L3) switching, a destination Internet Protocol (IP) address may be used to identify a flow. A generic flow may also be based on an "OpenFlow" profile that is defined by the OpenFlow standard. OpenFlow is a software-defined networking (SDN) standard that provides a communication protocol in SDN environments.

Before describing the details of the adaptive processes, the following describes some of the data structures/queues that are maintained at host memory 106. The various adaptive aspects described herein are of course not limited to these data structures/queues at the host memory 106 since they may be located at other storage locations, including NIC memory 132 and/or storage 118.

Figure 1D:
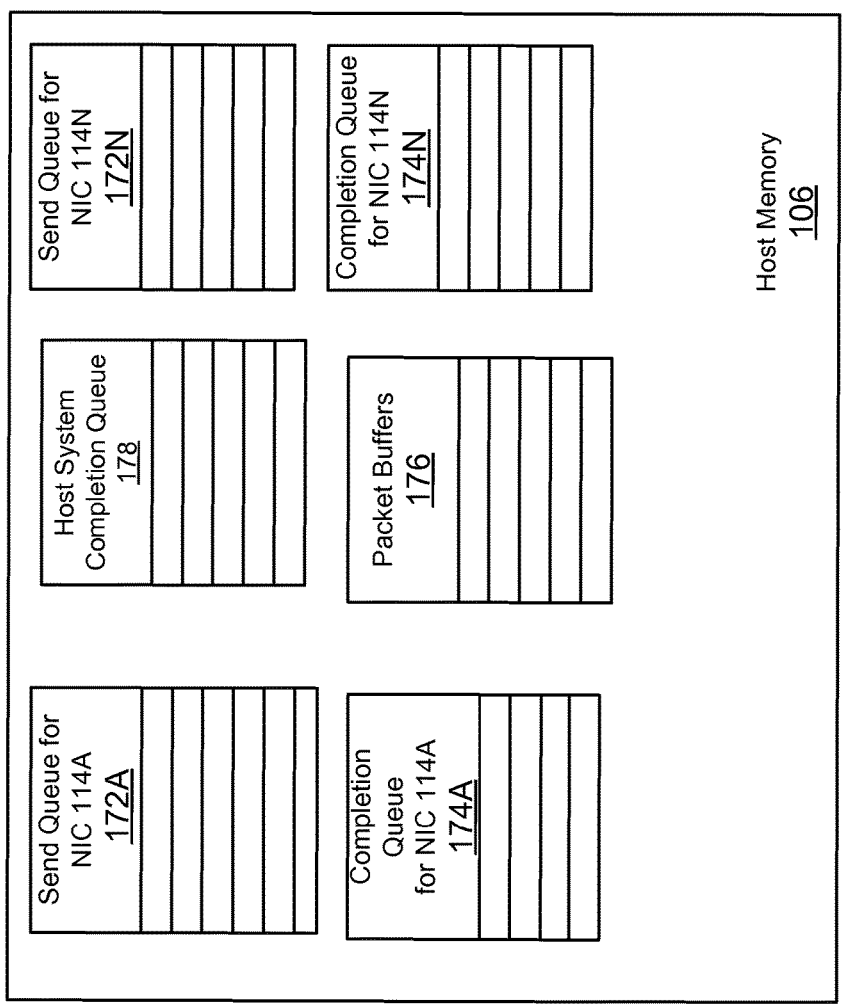
FIG. 1D shows an example of a host memory layout for implementing the various aspects of the present disclosure.

Host Memory 106:

FIG. 1D shows an example of the various data structures and queues that are used by the adaptive processes of the present disclosure. Memory 106 stores a send queue 172A for NIC 114A and a send queue 172N for NIC 114N. Completion queue 174A and 174N are provided so that when a request is completed, a completion status can be posted by the appropriate NIC.

When NIC 114A receives a packet for NIC 114N, then NIC 114A writes to send queue 172N and posts the packet at a location in buffer 176. NIC 114N retrieves the packet from the buffer 176 and transmits it to a destination. After the packet is transmitted, NIC 114N writes to the completion queue 174N so that NIC 114A is aware of the packet transmission.

To communicate with NIC 114N (or vice-versa), NIC 114A generates a doorbell message. This may be enabled by using a MSI-X (Message Signaled Interrupts) defined by the PCI-Express specification. An interrupt message is written to a PCI-Express address of the NIC 114N that generates a doorbell message for the send queue 172N. The message data includes a send queue tail or the message triggers reading of the send queue tail. As an example, interrupts/doorbell messages may be aggregated because the difference between a last sequential write and a current sequential write indicates a number of commands that may have been added to the send queue.

When any command is completed by the NIC 114N (or vice-versa), it generates a doorbell message for the NIC 114A. This may be enabled by modifying the MSI-X interrupt where an interrupt message is written to a PCIe address for the NIC 114A. The message includes a completion tail queue or triggers a reading of the completion queue tail.

Host memory 106 may also include a host system completion queue 178, where a message is placed for the host system by a NIC, when a particular packet flow is to be handled by host software 160, as described below in detail.

It is noteworthy that although the various buffers/queues of FIG. 1D are described with respect to memory 106, the adaptive aspects described herein are not limited to any particular location and the buffers/queues may be located at NIC memory 132 or any other location.

Process Flow:

FIG. 4 shows a process flow 200, according to one aspect of the present disclosure. The process begins in block B202, when the NICs and the host system 102A are initialized and operational. In block B204, a packet is received, for example, at NIC 114A. The packet is first validated and then in block B206, the NIC 114A identifies a flow that is associated with the received packet. This may be determined by the flow module 133A using the flow data structure 131A.

In block B207, NIC 114A determines if the packet is destined for another NIC and hence the flow is to be processed by the NIC rather than the host network stack 160. When the packet is destined for another NIC, for example, NIC 114N, then in block B208, NIC 114A places the packet at one of the packet buffers 176 in host memory 106. In block B210, NIC 114A writes an entry at the send queue for NIC 114N, for example, 172N. NIC 114A also initiates peer to peer communication with NIC 114N notifying NIC 114N that a message has been written at the send queue 114N. In block B212, NIC 114N reads the packet from host memory 106, prepares the packet for transmission and sends the packet to its destination. Thereafter, in block B214, NIC 114N writes at the completion queue 174N indicating that the packet has been transmitted. In block B216, NIC 114A is notified of the completion and in block B218, NIC 114A frees up an entry at the packet buffer 176 as well as at the send queue. The process then ends.

When the flow is not offloaded, as determined in block B207, then in block B220, NIC 114A places the packet at a buffer location for the host system processor 104. In block B222, NIC 114A writes an entry at a completion queue 178 for the host system and may signal the host system processor via an interrupt in block B224. The host system then completes the processing and the allocated buffer location for the host system is recycled for future use. Thereafter, the process ends.

Figure 2:
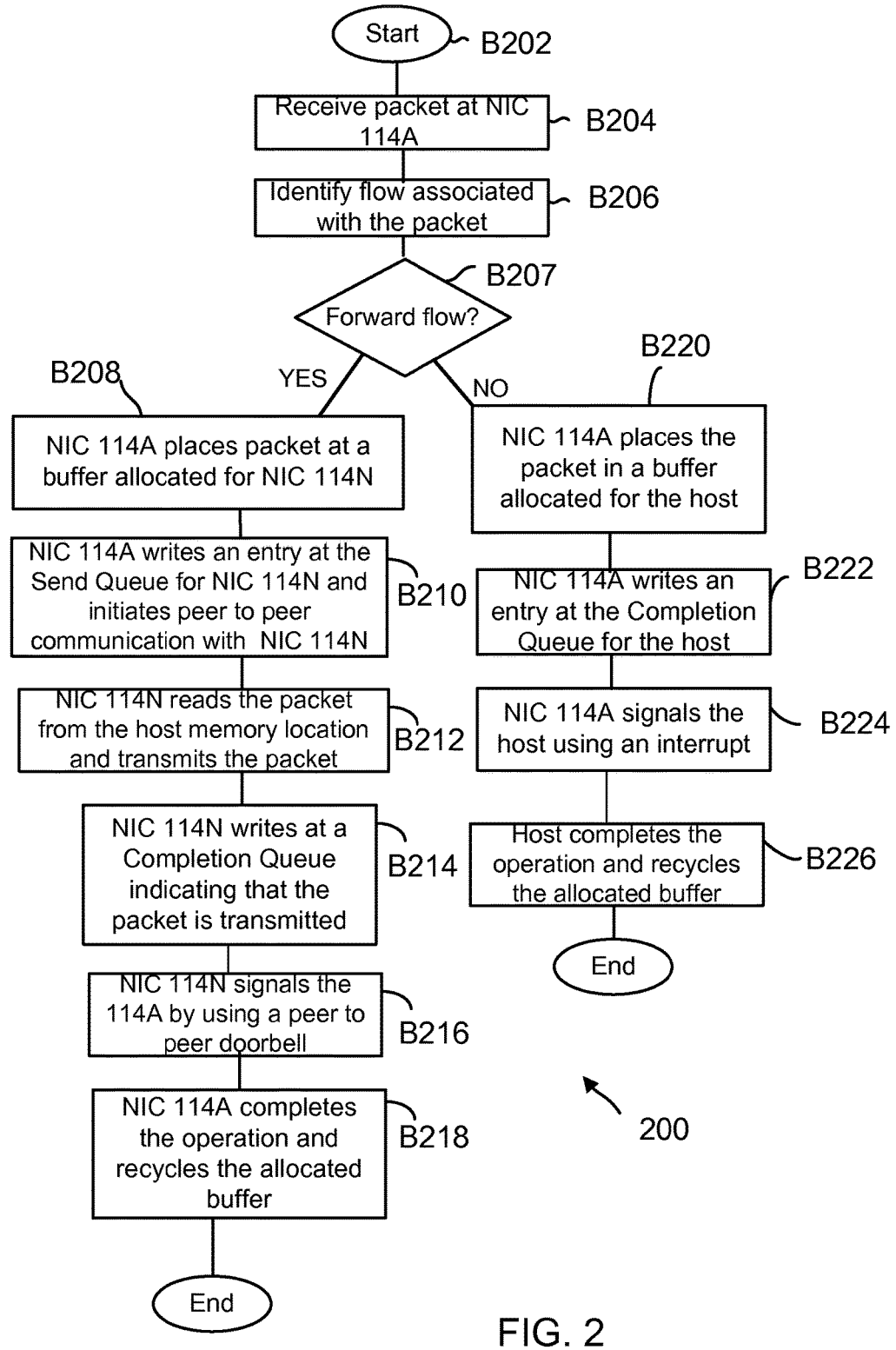
FIG. 2 shows a process flow for switching a network frame by a NIC, according to one aspect of the present disclosure.

It is noteworthy that although the foregoing example is based on two NICs, the process described above is applicable to a NIC that has more than one port (not shown). In this case, the NIC receives a packet at one port, identifies that the packet is destined for another port and then simply forwards the packet to the other port, without having to go through the host system CPU. In this example, the same NIC with two ports is considered as multiple NICs for executing the process 200 of FIG. 2

In one aspect, the hardware executable processes described above have advantages. For example, in a multiple NIC environment, NICs can transmit the packets using the send and completion queues, without having to use the host processors. This can improve throughput, lower latency, improve power efficiency and better utilize the host processor.

Although the present disclosure has been described with reference to specific aspects, these aspects are illustrative only and not limiting. For example, although the description above has been described with respect to a NIC, any other device may be configured to perform the foregoing function. Thus the term NIC, adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine implemented method, comprising:
receiving a network packet at a first network interface card (NIC) operationally coupled to a computing device;
identifying a second NIC as a destination for the network packet;
placing the network packet by the first NIC at a host memory location, without utilizing resources of a processor of the computing device;
notifying the second NIC that the network packet has been placed at the host memory location;
retrieving the network packet by the second NIC from the host memory location;
transmitting the network packet by the second NIC to another destination;
notifying the first NIC by the second NIC that the packet has been transmitted by the second NIC; and
freeing the host memory location by the first NIC.

2. The method of claim 1, further comprising:
freeing up space at a send queue used for notifying the second NIC that the network packet has been placed at the host memory.

3. The method of claim 1, wherein the first NIC and the second NIC are coupled to the computing device using a PCI-Express link.

4. The method of claim 1, wherein the first NIC and the second NIC use an Ethernet based networking protocol for network communication.

5. The method of claim 1, wherein the first NIC and the second NIC are converged network adapters that can process both network and storage traffic.

6. The method of claim 1, wherein the first NIC maintains a data structure to determine that the second NIC is the destination for the network packet.

7. The method of claim 1, wherein the computing device processes the network packet when a flow associated with the network packet is not offloaded to the first NIC.

8. A non-transitory, machine readable storage medium having stored thereon instructions for performing a method, comprising machine executable code which when executed by at least one machine, causes the machine to:
receive a network packet at a first network interface card (NIC) operationally coupled to a computing device;
identify a second NIC as a destination for the network packet;
place the network packet by the first NIC at a host memory location, without utilizing resources of a processor of the computing device;
notify the second NIC that the network packet has been placed at the host memory location;
retrieve the network packet by the second NIC from the host memory location;
transmit the network packet by the second NIC to another destination;
notify the first NIC by the second NIC that the packet has been transmitted by the second NIC; and
free the host memory location by the first NIC.

9. The non-transitory, storage medium of claim 8, further causing the machine to:
free up space at a send queue used for notifying the second NIC that the network packet has been placed at the host memory.

10. The non-transitory, storage medium of claim 8, wherein the first NIC and the second NIC are coupled to the computing device using a PCI-Express link.

11. The non-transitory, storage medium of claim 8, wherein the first NIC and the second NIC use an Ethernet based networking protocol for network communication.

12. The non-transitory, storage medium of claim 8, wherein the first NIC and the second NIC are converged network adapters that can process both network and storage traffic.

13. The non-transitory, storage medium of claim 8, wherein the first NIC maintains a data structure to determine that the second NIC is the destination for the network packet.

14. The non-transitory, storage medium of claim 8, wherein the computing device processes the network packet when a flow associated with the network packet is not offloaded to the first NIC.

15. A system comprising:
a computing device having a processor for executing instructions out of a host memory device and coupled to a first network interface card (NIC) and a second NIC;
wherein the first NIC receives a network packet at the first network interface card (NIC) operationally coupled to a computing device; identifies the second NIC as a destination for the network packet; places the network packet at a host memory location, without utilizing resources of the processor of the computing device; and notifies the second NIC that the network packet has been placed at the host memory location; and
wherein the second NIC retrieves the network packet from the host memory location; transmits the network packet to another destination; notifies the first NIC that the packet has been transmitted by the second NIC; and the first NIC frees the host memory location.

16. The system of claim 15, wherein the first NIC frees up space at a send queue used for notifying the second NIC that the network packet has been placed at the host memory.

17. The system of claim 15, wherein the first NIC and the second NIC are coupled to the computing device using a PCI-Express link.

18. The system of claim 15, wherein the first NIC and the second NIC use an Ethernet based networking protocol for network communication.

19. The system of claim 15, wherein the first NIC and the second NIC are converged network adapters that can process both network and storage traffic.

20. The system of claim 15, wherein the first NIC maintains a data structure to determine that the second NIC is the destination for the network packet for network communication.

21. The system of claim 15, wherein the computing device processes the network packet when a flow associated with the network packet is not offloaded to the first NIC.

* * * * *